(No Model.)

J. BUCKNER.
PNEUMATIC TIRE.

No. 542,842. Patented July 16, 1895.

WITNESSES:
A. D. Harrison.
W. F. McLeod.

INVENTOR:
J. Buckner
by Wright Brown Quinby
Attys.

UNITED STATES PATENT OFFICE.

JAMES BUCKNER, OF ALLSTON, MASSACHUSETTS, ASSIGNOR OF ONE-HALF TO FRANK E. WINGATE, OF SAME PLACE.

PNEUMATIC TIRE.

SPECIFICATION forming part of Letters Patent No. 542,842, dated July 16, 1895.

Application filed March 2, 1894. Serial No. 502,112. (No model.)

*To all whom it may concern:*

Be it known that I, JAMES BUCKNER, of Allston, in the county of Suffolk and State of Massachusetts, have invented certain new and useful Improvements in Pneumatic Tires, of which the following is a specification.

This invention relates to pneumatic tires for bicycle and other wheels, comprising an air-cushioned tube and metallic armor protecting the tread of the tube, and a sheath or shoe inclosing the tube and its armor.

The invention has for its object to provide an improved construction of the tube, armor, and sheath, looking to the increased durability, efficiency, and desirability of the tire, and also to provide improved means for securing the tire to the wheel-rim.

To these ends the invention consists in the improvements which I will now proceed to describe.

Figure 1:
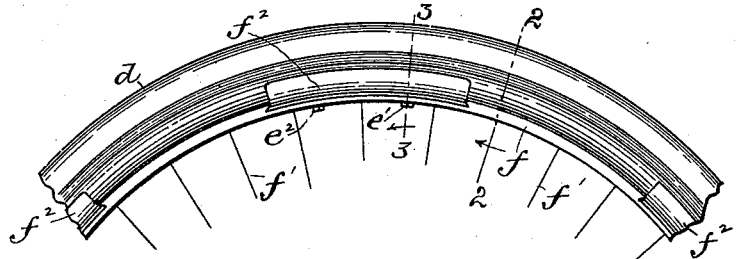
Figure 2:
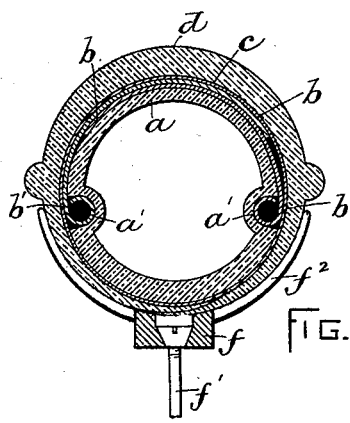
Figure 3:
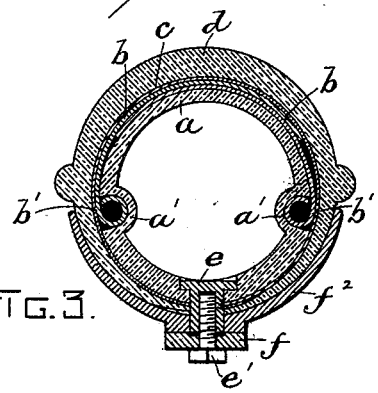
Figure 4:
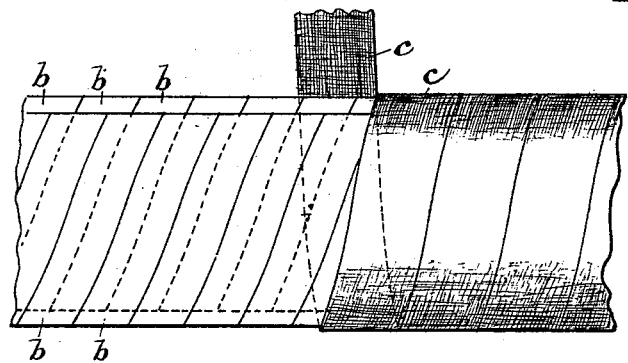
Figure 5:
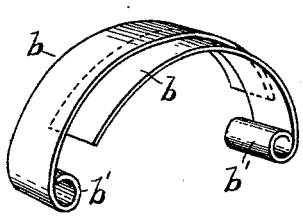
Figure 6:
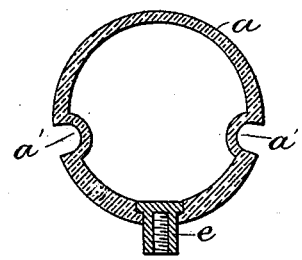
Figure 7:
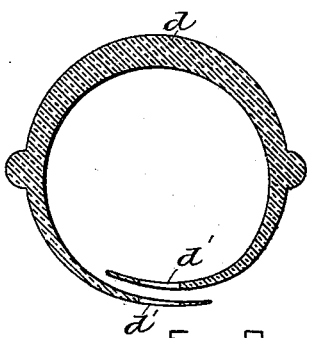

Of the accompanying drawings, forming part of this specification, Figure 1 represents a side elevation of a portion of a bicycle-wheel having my improved tire. Fig. 2 represents a section on line 2 2 of Fig. 1. Fig. 3 represents a section on line 3 3 of Fig. 1. Fig. 4 represents a plan view of a portion of the tire, the sheath being removed. Fig. 5 represents a perspective view showing the relative positions of the resilient strips comprising the armor. Fig. 6 represents a transverse section of the air-cushioned tube without the armor and sheath. Fig. 7 represents a transverse section showing the sheath or shoe removed from the air-cushioned tube.

The same letters of reference indicate the same parts in all the figures.

In the drawings, $a$ represents a continuous tube of elastic material, such as is usually employed in the manufacture of air-cushioned tires, said tube being adapted to confine a cushion of air. The upper portion of the tube is made thinner than the under portion, the thickness gradually increasing from the outer or tread portion to the inner portion.

$a'$ $a'$ represent continuous grooves formed in the sides of the tube $a$ at opposite sides of the tread portion thereof, and preferably somewhat below the center of the tube, the object of said grooves being to receive heads or enlargements $b'$ on the resilient armor or protecting strips $b$ which extend over the tread-surface of the tube. Each strip $b$ is composed of a suitable resilient metal, preferably steel, and is bent at one end to form an inwardly-projecting rounded head or protuberance $b'$.

The strips may be "vulcanized," or in other words, first treated by acid to rust the surfaces and then dipped in a rubber solution to form a rubber coating, said coating being finally cured or vulcanized, this treatment enabling the strips to be secured by rubber cement to the tube and to the subsequently-applied rubber-tape covering. Each head or protuberance $b'$ is formed to closely fit one of the grooves $a'$, each groove being preferably somewhat contracted at its mouth, so that it will engage and grasp the head or projection that is pushed into it.

The strips $b$ are divided into two series, those of one series being engaged at their headed ends with the groove in one side of the tube, while those of the other series have their headed ends engaged with the gooove at the opposite side of the tube. The strips of one series extend in one direction across the tread portion of the tube, while the strips of the opposite series extend in the opposite direction across said tread-surface, the tread ends of the strips of one series overlapping the free ends of the strips of the other series. This arrangement gives the protection of a double thickness of armor along the tread-surface, and increases the resilience of the tire.

I prefer to arrange the strips so that those of one series break joints with those of the other series, as illustrated in Figs. 4 and 5, this arrangement making the resilience of the tire more uniform than it would be if the joints of the two series of strips coincided. I also prefer to arrange the strips $b$ diagonally, as shown in Fig. 4, although I do not limit myself to this arrangement, and may arrange the strips so that they will extend at right angles to the length of the tire.

In applying the strips $b$ to the tube $a$ I engage the heads $b'$ of said strips with the grooves $a'$ by pressing said heads into the grooves, fixing them firmly in said grooves and on the tube $a$, as well as to each other, with rubber cement, and then securing the strips firmly in place by winding upon the exterior of the tube a continuous strip c, composed preferably of what is known as "rubber tape," although any suitable flexible fibrous material may be used, using rubber cement to firmly fix it in position as wound, said tape thus constituting a practically continuous cover, firmly binding the strips upon the tube. The strips are made so thin and flexible that they conform readily to all curvatures that the tire may assume under pressure.

d represents the sheath or shoe, which is formed to inclose the tube a and its armor and covering, said shoe being made of elastic material and gradually reduced in thickness from its center or tread portion to its edges, the latter being formed to overlap each other, as shown in Fig. 7, the sheath being molded in substantially the form shown in said figure. The overlapping portions of the sheath are provided with apertures d', arranged to receive internally-threaded socketed studs or bolts e, which are secured to and project from the inner periphery of the tube a, said studs being preferably of brass and permanently secured to the tube a by being molded into the latter. The studs e are of sufficient length to pass through the overlapping portions of the sheath and through the saddles, hereinafter described. Each stud receives a screw or bolt e', as shown in Fig. 3, the heads of said bolts bearing on the under surface of the wheel-rim f.

I prefer to provide the sheath d with continuous beads or protuberances $d^2$ at the opposite sides of its tread portion, said protuberances acting as guards or buffers for the side portions of the tire. Said beads are particularly desirable when the tire is used on a carriage-wheel and may be omitted when the tire is used on a bicycle-wheel.

f represents the rim of the wheel, which is provided with orifices to receive the bolts e', as shown in Fig. 3, and is suitably secured to the spokes f'. Said rim is preferably provided with a series of trough-shaped sections or saddles $f^2$ bolted or otherwise attached to the rim at suitable distances apart, said saddles being formed to support the sides of the tire at frequent intervals and thus prevent the tire from injuriously bulging outward under pressure. The saddles f' are formed to bear upon seats or depressions formed in the rim f, as clearly shown in Fig. 1, the ends of the saddles and the corresponding ends of the seats being dovetailed, so that the saddles may be interlocked with the rims by being moved laterally into the seats. The saddles are first attached to the tire and then engaged with the rim f by a lateral movement of the tire. The studs e and bolts e' may pass through the saddles; but as the number of said studs and bolts required to secure the tire is less than the total number of saddles, independent or additional fastening devices will be required, such as bolts $e^2$, Fig. 1, which may connect the rim to the saddles.

The saddles, separated from each other as shown, give the tire suitable side support without unduly increasing the weight of the wheel. They may be made of aluminum, if desired, for the sake of lightness. The rim f may also be made of aluminum, if desired, for the sake of lightness, or the rim may be of steel, the saddles being of aluminum.

I claim—

1. A pneumatic tire comprising in its construction an air cushioned inner tube, resilient tread-protecting strips arranged in two series on the outer portion of said tube, the strips of one series overlapping those of the other series so that the strips f constitute a double thickness of armor along the tread surface, each strip having one end provided with a head or enlargement and a sheath or shoe formed to inclose the tube and its protecting strips.

2. A pneumatic tire comprising in its construction an air-cushioned inner tube having continuous side grooves with resilient tread-protecting strips, each having a head at one end formed to engage one of said grooves, its other end being free, said strips being arranged in two series, the free ends of one series overlapping the free ends of the other series over the tread portion of the tube; and the sheath or shoe formed to inclose the tube and its protecting strips.

3. A pneumatic tire comprising in its construction an air-cushioned inner tube the walls of which increase in thickness from the tread to the inner portion; a sheath or shoe formed to inclose said tube and having side protuberances and overlapping edges, said shoe decreasing in thickness from its tread portion to its edges; and means for securing the edges of the shoe to the tube.

4. A pneumatic tire comprising in its construction an air-cushioned inner tube provided at opposite sides of its tread portion with continuous grooves, a series of resilient tread-protecting strips having heads or projections fitting the said grooves of the inner tube, and an inclosing sheath or shoe confining the strips with their heads in said grooves.

5. The combination of a pneumatic tire, sectional saddles formed to support the sides of said tire, and a wheel rim to which said saddles are detachably connected.

6. The combination of a pneumatic tire, sectional saddles formed to support the side of said tire and having dove-tail ends and a wheel rim having saddle seats with dove-tail ends formed to engage the ends of the saddles.

In testimony whereof I have signed my name to this specification, in the presence of two subscribing witnesses, this 26th day of February, A. D. 1894.

JAMES BUCKNER.

Witnesses:
WM. H. SAYWARD,
FRANK E. WINGATE.